(12) United States Patent
Hartmann et al.

(10) Patent No.: US 7,475,143 B2
(45) Date of Patent: Jan. 6, 2009

(54) SERVER DISPLAY CONFIRMATION RECORD RESPONSE IN A CONNECTION ORIENTED CLIENT/SERVER PROTOCOL

(75) Inventors: Richard G. Hartmann, Endicott, NY (US); Daniel L. Krissell, Hallstead, PA (US); Thomas E. Murphy, Jr., Binghamton, NY (US); Francine M. Orzel, Endicott, NY (US); Paul F. Rieth, Apalachin, NY (US); Jeffrey S. Stevens, Endwell, NY (US)

(73) Assignee: International Business Machines Corporation, Armonk, NY (US)

( * ) Notice: Subject to any disclaimer, the term of this patent is extended or adjusted under 35 U.S.C. 154(b) by 551 days.

(21) Appl. No.: 09/932,615

(22) Filed: Aug. 17, 2001

(65) Prior Publication Data

US 2003/0055976 A1 Mar. 20, 2003

Related U.S. Application Data

(63) Continuation-in-part of application No. 09/827,012, filed on Apr. 5, 2001, now Pat. No. 6,931,438.

(51) Int. Cl.
*G06F 15/16* (2006.01)
(52) U.S. Cl. .................... 709/227; 709/228; 709/229
(58) Field of Classification Search ......... 709/227–230, 709/232, 225; 713/153, 201, 202; 707/100, 707/102, 4
See application file for complete search history.

(56) References Cited

U.S. PATENT DOCUMENTS

| | | | | |
|---|---|---|---|---|
| 4,885,789 A | | 12/1989 | Burger et al. .................. | 380/25 |
| 5,931,913 A | * | 8/1999 | Meriwether et al. ......... | 709/227 |
| 5,937,159 A | * | 8/1999 | Meyers et al. ............... | 713/201 |
| 5,950,195 A | * | 9/1999 | Stockwell et al. .............. | 707/4 |
| 6,003,084 A | * | 12/1999 | Green et al. ................. | 709/227 |
| 6,076,110 A | * | 6/2000 | Murphy et al. .............. | 709/228 |
| 6,122,276 A | * | 9/2000 | Boe et al. .................... | 370/389 |
| 6,128,662 A | * | 10/2000 | Bolton et al. ................ | 709/228 |
| 6,134,544 A | | 10/2000 | Glitho et al. ................... | 707/3 |
| 6,151,628 A | * | 11/2000 | Xu et al. ..................... | 709/225 |
| 6,154,768 A | * | 11/2000 | Chen et al. .................. | 709/203 |
| 6,182,220 B1 | * | 1/2001 | Chen et al. .................. | 713/182 |
| 6,289,463 B1 | * | 9/2001 | Fink ........................... | 713/202 |
| 6,470,453 B1 | * | 10/2002 | Vilhuber ..................... | 713/201 |
| 6,502,192 B1 | * | 12/2002 | Nguyen ...................... | 713/201 |

OTHER PUBLICATIONS

Murphy et al., 5250 Telnet Enhancements RFC 2877; Jul. 2000.*
Intercepting Telnet Data, IBM TDB Jun. 1993. Delphion Intellectual Property Network, http://www.delphion.com/tdbs/tdb?&order=93A+61393, accessed Jan. 25, 2001.
T. Murphy, et al. *5250 Telnet Enhancements*. Network Working Group Request for Comments: 2877. Jul. 2000. http://www.ietf.org/rfcs/rfc2877.txt.

* cited by examiner

*Primary Examiner*—Glenton B. Burgess
*Assistant Examiner*—Aaron Strange
(74) *Attorney, Agent, or Firm*—Shelley M. Beckstrand

(57) ABSTRACT

A system and method for operating a Telnet client to establish a network connection with a Telnet server. Environment parameters are negotiated for establishing a connection-oriented connection of the client to the server, the parameters optionally including a request for the server to provide a custom confirmation record. Responsive to that request, the server provides a custom confirmation record to the client selectively including default or defined custom information generated according to a customer provided exit program.

106 Claims, 3 Drawing Sheets

SERVER DISPLAY CONFIRMATION RECORD RESPONSE IN A CONNECTION ORIENTED CLIENT/SERVER PROTOCOL

CROSS REFERENCE TO RELATED APPLICATION

This application is a Continuation-In-Part of U.S. patent application Ser. No. 09/827,012, filed 5 Apr. 2001 by R. G. Hartmann, et al. (now U.S. Pat. No. 6,931,438, issued 16 Aug. 2005) for System and Method for Server display Confirmation Record Response in a Connection Oriented Client/Server Protocol.

BACKGROUND OF THE INVENTION

1. Technical Field of the Invention

This invention pertains to connection oriented client/server negotiation protocols. More specifically, it pertains to Telnet negotiation protocols for display and printer sessions allowing transfer of default or defined custom information within a confirmation record at the request of the client.

2. Background Art

There is a need in the art to enable a Telnet client when attempting to connect to a Telnet server to obtain connection status information including, for example, why did a connection request fail; why did a client auto-sign-on request fail; or what is the name of the virtual terminal display device assigned to this client. Auto-sign-on requests may fail, for example, because of an incorrect password or profile, a disabled or unknown profile, required encryption, expired user, and so forth.

This traditional Telnet support is accomplished in accordance with the following suite of Network Working Group Request for Comments (RFCs): Postel, J. and J. Reynolds, "Telnet Protocol Specification", STD 8, RFC 854, May 1983; Postel, J. and J. Reynolds, "Telnet Option Specifications", STD 8, RFC 855, May 1983; Postel, J. and J. Reynolds, "Telnet Binary Transmission", STD 27, RFC 856, May 1983; VanBokkeln, J., "Telnet Terminal-Type Option", RFC 1091, February 1989; Postel, J. and J. Reynolds, "Telnet End of Record Option", RFC 885, December 1983; Alexander, S., "Telnet Environment Option", RFC 1572, January 1994; Chmielewski, P., "5250 Telnet Interface", RFC 1205, February 1991; Postel, J. and J. Reynolds, "Telnet Supress Go Ahead Option", STD 29, RFC 858, May 1983; and Reynolds, J. and J. Postel, "Assigned Numbers", STD 2, RFC 1700, October 1994.

The above suite of referenced RFCs jointly and severely fall short of providing an understanding of why a connection request has failed, and such is needed in the art to enable a client to correct the problem and retry a connection request such that it will be successful.

Similarly, when a connection request has succeeded, the client may need to know additional information, such as the name of the virtual terminal display device assigned to this client. Knowing the device name of a client connection is useful for audit logging, billing and error analysis for connected clients. Heretofore, screen scraping technology has been employed to acquire such a device name, relying on the screen layout to analyze the location of the device name on the screen. If the sign-on panel is altered such that the device name is in a different location, screen scraping fails. Also, this screen scraping technology does not work when the sign-on panel is bypassed.

In a client/server network, both client terminal and printer emulators often connect to a server on a host system. This host system can do different kinds of processing on the client session request based on client information, such as IP address, terminal or printer device requested, and auto-signon information. Some of the things that can be done include: accept or deny the connection based on the IP address or port; allow or disallow access to the request display or printer device for authority reasons, or switch the name of the requested device; route the client session to a particular subsystem on the host for processing, such as for workload balancing or language support; perform auto-signon services for the client, bypassing the logon screen; perform audit and security logging on the connection request; associate a client session with other client sessions running on the host, such as associating printer with a display session; and run a custom exit program to do "anything" the system owner desires.

It is often desirable to return the result of this processing to the client emulator. The client emulator can take advantage of information in various ways. Some of these include: post the name of the assigned terminal or printer device that was allocated by the host; post the name of an associated terminal or printer device that was linked to this session by the host; when printing, the client will know where (which printer, what building, what room) output can be picked up; tell the client what kind of security level the system is running, and which kind of password encryption is required; if a particular request, such as for device name, is rejected, retry with another device; if auto-signon is failing, client would like some indication why, such as password expired, profile disabled, no such profile, system lockout—so the problem can be automatically fixed; if system is overloaded, client would like to know session connection request was denied for workload reasons, such as off-peak hours, to try later or be redirected to another host; and read and interpret any custom information sent by the server side exit program.

These are only some of the possible things a client emulator could exploit, and there are many custom applications that could be done simply if both the server and the client could run exit programs on the session connection request. However, none of this can be done without a mechanism to return the results of this processing from the server to the client emulator. There is a need, therefore, in the art to allow client emulators to request that custom information be returned by the server thereby allowing the customers to exploit custom solutions between clients and servers.

It is, therefore, an object of the invention to provide an improved system and method for client/server session connection.

It is an object of the invention to provide an improved system and method for establishing a client/server connection.

It is a further object of the invention to provide an improved system and method for negotiating a client/server connection in a connection-oriented protocol.

It is a further object of the invention to provide a system and method allowing customers to exploit custom solutions between clients and servers.

It is a further object of the invention to provide a system and method for enabling client emulators to request that custom information be returned by servers.

It is a further object of the invention to provide a system and method for exploiting confirmation records technology to enable clients to receive custom information from servers during session connection.

SUMMARY OF THE INVENTION

A system and method for operating a client and a server to establish a network connection.

A system and method for operating a client and a server to establish a network connection. Environment parameters are negotiated for establishing a connection-oriented connection of the client to the server, the parameters optionally including an invitation on the part of the server for the client to request a custom confirmation record. Responsive to that invitation, the client may request a default custom confirmation record or a defined custom confirmation record.

In accordance with an aspect of the invention, there is provided a computer program product configured to be operable to operating a server in a network according to method steps including providing to a client an optional default or defined custom confirmation record.

Other features and advantages of this invention will become apparent from the following detailed description of the presently preferred embodiment of the invention, taken in conjunction with the accompanying drawings.

BEST MODE FOR CARRYING OUT THE INVENTION

Parent application, Hartmann, et al. Ser. No. 09/827,012, (hereafter, Hartmann) supra, relates to a confirmation record requested by a client from a server. The server responds in the confirmation record with a return code that indicates the success or reason for failure to satisfy the request, and allows for data to be exchanged only in the direction from server to client.

The present invention provides a customized confirmation record. The information is exchanged in the same confirmation record as in the parent application, however, the client can request of the server application additional predefined custom information.

Figure 1:
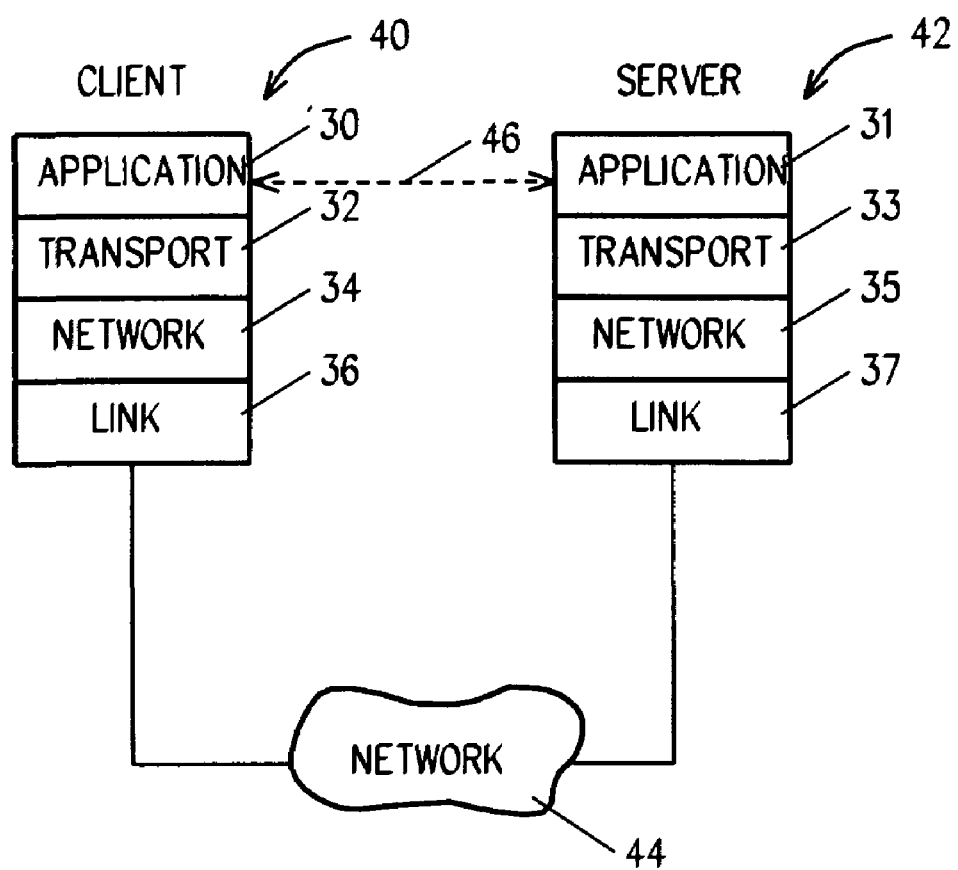
FIG. 1 is a system diagram illustrating a client/server system.

Referring to FIG. 1, a confirmation record technology is provided for connection oriented client/server sessions, such as TCP/IP Telnet display sessions.

A typical protocol stack includes application 30, transport 32, network 34 and link layers 36. Telnet, for example, is an application that executes in application layer 30 and, as is represented by line 46, is in virtual connection or communication with application layer 31 at server 42. In such a protocol stack, communication is between corresponding layers. Thus, application layer may be in communication with application layer 30, transport layer 32 with layer 33, network layer 34 with network layer 35, and link layer 36 is physically connected through network 44 with link layer 37.

This confirmation record technology is described hereafter and in T. Murphy, Jr., P. Rieth, J. Stevens, "5250 Telnet Enhancements", Network Working Group Request for Comments (RFC): 2877, July 2000, the teachings of which are incorporated by reference. In RFC 2877, a version of a confirmation record is used by SNA printers. In this version, the confirmation record is always sent to printer emulators and returns the name of the host system, the name of the virtual printer device assigned and any error or success codes. With this technology, a Telnet client 40, for example, can connect to a Telnet server 42 over a network connection 44 and optionally request a detailed return code that describes the status of the connection. With the information of the return code, the client 40 is able to ascertain in the event of a successful connection the name of the virtual display device assigned to this client 40, and in the event of an unsuccessful connection the information required to correct the problem and retry a connection request such that it is successful. In the event of a successful connection, the return code, or confirmation record, allows the client to know the virtual terminal device name without the need to employ a screen scrape scheme to analyze the sign-on panel, assuming it is even available. Knowing the virtual terminal device name enables the client to assign a session name to the GUI window for the client emulator. Also, knowing the device name of a client connection is very useful for audit logging, billing and error analysis for connection clients.

Figure 2:
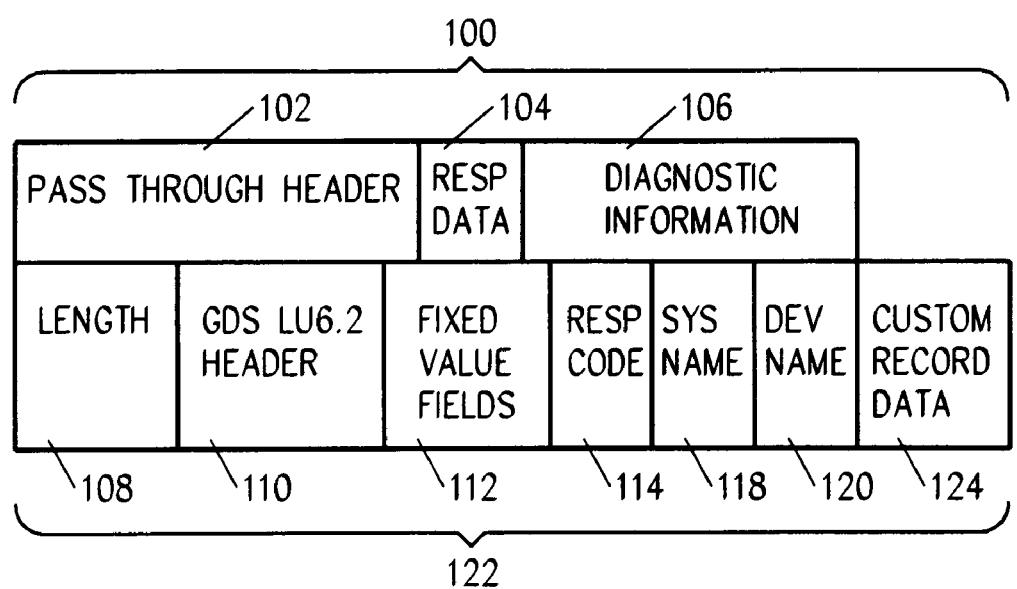
FIG. 2 is a diagram illustrating the format of a response record in accordance with the preferred embodiment of the invention.

Referring to FIG. 2, the format of a response record 100 includes pass through header 102, response data 104, and diagnostic information 106. Pass through header 102 includes length field 108, header 110, and several characters from fixed value fields 112. Response data 104 includes several characters from field 112. Diagnostic information includes a few characters from field 112, response code 114, system name 118 and device name 120. In accordance with the present invention, the format of the response record is extended to allow the insertion of application specific information that can be passed at the application level between server and client systems. This new record layout 122 allows for the server 42 to return custom (default or defined) information 124 to the client 40, and for the client to react to information from the server. This application specific information can come from exit programs running in application layers 30, 31 on either or both the server and client machines, or can come from a custom version of either the server or client. In accordance with a preferred embodiment of the invention, this extension 124 to the confirmation record is optional, and must be specifically requested by the client emulator in order for it to be returned, thus insuring compatibility with emulators that do not support it. If custom confirmation record 122 is not specifically requested via the new environment variable, then the old version of the confirmation record 100 is sent.

Table 1 presents an example (from the parent application) of a success response record 100 according to the format of FIG. 2, and Table 2 presents an error response record 100 according to the same format. Table 3 gives some of the response codes 114 for a success response 100 and Table 4 some of the response codes 114 for an error response record 100. The response record in Table 2 is one that reports an error. In this example, the virtual device named "MYDEVICE", is not available on the target system "TARGET", because the device is not available. This error may indicate that the device was already assigned to another Telnet session.

TABLE 1

Example Success Response Record

```
+------------------------------------------------------------------------------+
|         +----- Pass-Through header                                           |
|         |     +--- Response data                                             |
|         |     |    +---- Start diagnostic information                        |
|         |     |    |                                                         |
| +-------+++---+++--+-----------------------------------------------------    |
| |       ||    ||   |                                                         |
| 004912A090000560060020C0003D0000C9F9F0F2E3C1D9C7C5E34040D4E8C4C5              |
|                               |    | T A R G E T     M Y D E                 |
|                               +--------+                                     |
|                               Response Code (I902)                           |
| --------------------------------------------------------------------------   |
| E5C9C3C540400000000000000000000000000000000000000000000000000000             |
|  V I C E                                                                     |
|                         +------- End of diagnostic information               |
|                         |                                                    |
| ------------------------+                                                    |
| |                                                                            |
| 000000000000000000                                                           |
+------------------------------------------------------------------------------+
```

'0049'X = Length pass-through data, including this length field  
'12A0'X = GDS LU6.2 header  
'90000560060020C0003D0000'X = Fixed value fields  
'C9F9F0F2'X = Response Code (I902)  
'E3C1D9C7C5E34040'X = System Name (TARGET)  
'D4E8C4C5E5C9C3C54040'X = Object Name (MYDEVICE)

TABLE 2

Example Error Response Record

```
+------------------------------------------------------------------------------+
|         +----- Pass-Through header                                           |
|         |     +--- Response data                                             |
|         |     |    +---- Start diagnostic information                        |
|         |     |    |                                                         |
| +-------+++---+++--+-----------------------------------------------------    |
| |       ||    ||   |                                                         |
| 004912A09000056006008200003D0000F8F9F0F2E3C1D9C7C5E34040D4E8C4C5              |
|                               |    | T A R G E T     M Y D E                 |
|                               +--------+                                     |
|                               Response Code (8902)                           |
| --------------------------------------------------------------------------   |
| E5C9C3C540400000000000000000000000000000000000000000000000000000             |
|  V I C E                                                                     |
|                         +------- End of diagnostic information               |
|                         |                                                    |
| ------------------------+                                                    |
| |                                                                            |
| 000000000000000000                                                           |
+------------------------------------------------------------------------------+
```

Example of an error response record.  
'0049'X = Length pass-through data, including this length field  
'12A0'X = GDS LU6.2 header  
'90000560060020C0003D0000'X = Fixed value fields  
'F8F9F0F2'X = Response Code (8902)  
'E3C1D9C7C5E34040'X = System Name (TARGET)  
'D4E8C4C5E5C9C3C54040'X = Object Name (MYDEVICE)

TABLE 3

Start-Up Response Record Success Response Codes

| CODE | DESCRIPTION |
| --- | --- |
| I901 | Virtual device has less function than source device |
| I902 | Session successfully started |
| I906 | Automatic sign-on requested, but not allowed. Session still allowed; a sign-on screen will be coming. |

TABLE 4

Start-Up Response Record Error Response Codes

| CODE | DESCRIPTION |
| --- | --- |
| 2702 | Device description not found. |
| 2703 | Controller description not found. |
| 2777 | Damaged device description. |
| 8901 | Device not varied on. |
| 8902 | Device not available. |
| 8903 | Device not valid for session. |

TABLE 4-continued

Start-Up Response Record Error Response Codes

| CODE | DESCRIPTION |
|---|---|
| 8906 | Session initiation failed. |
| 8907 | Session failure. |
| 8910 | Controller not valid for session. |
| 8916 | No matching device found. |
| 8917 | Not authorized to object. |
| 8918 | Job canceled. |
| 8920 | Object partially damaged. |
| 8921 | Communications error. |
| 8922 | Negative response received. |
| 8923 | Start-up record built incorrectly. |
| 8925 | Creation of device failed. |
| 8928 | Change of device failed. |
| 8929 | Vary on or vary off failed. |
| 8930 | Message queue does not exist. |
| 8934 | Start-up for S/36 WSF received. |
| 8935 | Session rejected. |
| 8936 | Security failure on session attempt. |
| 8937 | Automatic sign-on rejected. |
| 8940 | Automatic configuration failed or not allowed. |
| I904 | Source system at incompatible release. |

Figure 3:
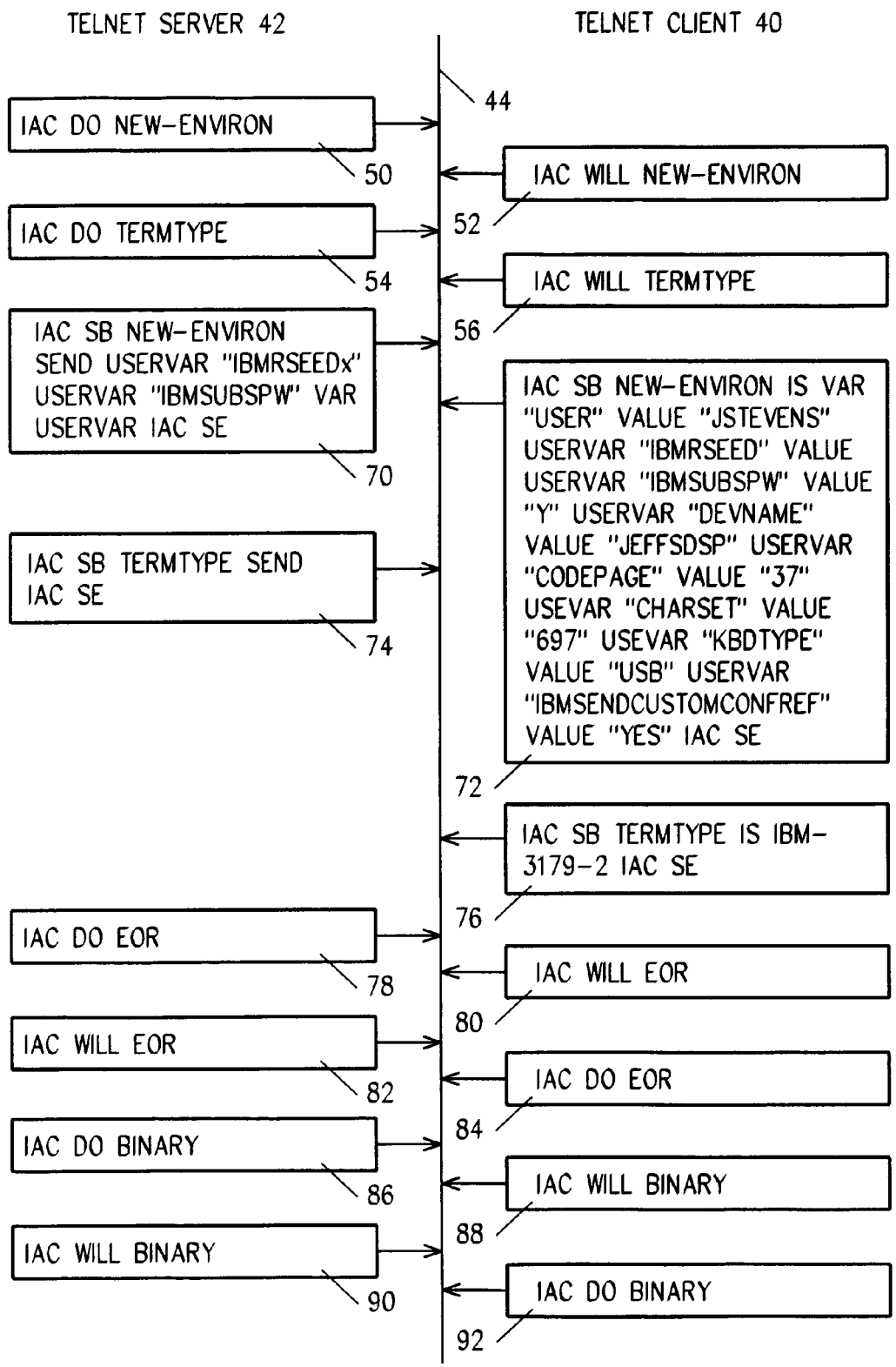
FIG. 3 is a flow chart representation of negotiations for a default custom confirmation record in accordance with the preferred embodiment of the invention.

Referring to FIG. 3, method steps of an exemplary negotiation for a custom confirmation record in accordance with a preferred method of the invention are summarized.

In step 50, server 42 invites client 40 to engage in new environment negotiations. These negotiations are conducted in accordance with procedures described in S. Alexander, "Telnet Environment Options Negotiations", RFC 1572, January 1994.

In step 52, client 40 accepts the invitation to negotiate a new environment.

In step 54, server 42 opens negotiations for terminal type, which client 40 accepts in step 56.

In step 70, server 42 instructs client 40 to send several parameters, and extends two invitations to the client to request additional information, including VAR and USER-VAR. In step 72 client 40 responds. In accordance with the preferred embodiment of the invention, in the response of step 72, client 40 requests with the code "USERVAR 'IBMSEND-CUSTOMCONFREC' VALUE 'YES'" that server 42 send a default custom confirmation record 122. Alternatively, such a request may be implied from some other parameter in connection with the new environment negotiations. Thus, for example, client 40 may have to specifically request a confirmation record 100 when requesting connection of a virtual display device, but such would be implied when requesting connection of a virtual printer device. Client 40 may also respond to the USERVAR invitation of step 70 with USER-VAR "IBMSENDCUSTOMCONFREC" having a VALUE not "YES". In this case, the VALUE would specify a defined custom confirmation record in the form, for example, of a space delimited list. In the case of such a defined custom confirmation record, server 42 could have been provided with an exit program for execution within application layer 31 for responding to each prospective item in the delimited list.

In a client/server network, both client terminal and printer emulators often connect to a server on a host system. This host system can do different kinds of processing on the client session request based on client information, such as IP address, terminal or printer device requested, and auto-signon information. Some of the things that can be done include: accept or deny the connection based on the IP address or port; allow or disallow access to the request display or printer device for authority reasons, or switch the name of the requested device; route the client session to a particular subsystem on the host for processing, such as for workload balancing or language support; perform auto-signon services for the client, bypassing the logon screen; perform audit and security logging on the connection request; associate a client session with other client sessions running on the host, such as associating printer with a display session; and run a custom exit program to do "anything" the system owner desires.

In accordance with the present invention, a system and method is provided for returning the result of this processing to the client emulator in the form of various return codes or other information items. The client emulator can take advantage of information in various ways. Some of these include: post the name of the assigned terminal or printer device that was allocated by the host; post the name of an associated terminal or printer device that was linked to this session by the host; when printing, the client will know where (which printer, what building, what room) output can be picked up; tell the client what kind of security level the system is running, and which kind of password encryption is required; if a particular request, such as for device name, is rejected, retry with another device; if auto-signon is failing, client would like some indication why, such as password expired, profile disabled, no such profile, system lockout—so the problem can be automatically fixed; if system is overloaded, client would like to know session connection request was denied for workload reasons, such as off-peak hours, to try later or be redirected to another host; and read and interpret any custom information sent by the server exit program.

A set of these above described information codes or items may be returned to a client in a default custom confirmation record (such as in response to IBMSENDCUSTOMCONFREC VALUE YES), and other items defined by way of personalized exit programs for return in a defined custom confirmation record (such as when IBMSENDCUSTOM-CONFREC VALUE is not YES but rather a list of one or more specific information items.)

Negotiations continue in steps 76-92, for such additional negotiations as end-of-record and binary, and thereafter server 42 transmits the requested default or defined confirmation record, followed in case of a successful connection with the data stream.

In Table 5, an expanded example is presented of environment option negotiations in accordance with the parent application. As shown, clear text is followed by hex representation. Thus, line 2 'FFFD27' is the hex representation of line 1 'IAC DO NEW-ENVIRON', lines 13-14 are the hex representation of lines 9-12, and lines 58-62 are a hex representation of the confirmation record of FIG. 2. The request for a confirmation record is illustrated at line 24. In line 59, the hex value 'C9F9F0F2' represents the successful return code 114 of I902 (see Table 3), and the device name 120 assigned to this virtual device is in the following ten hex bytes 'D1C5C6C6 E2C4E2D7 4040' on lines 59 and 60. IAC is a Telnet option negotiation code meaning "Interpret as command", SB represents "begin" and SE "end".

TABLE 5

TN5250E Environment Option Negotiations

| Telnet Server | | Telnet Client |
|---|---|---|
| IAC DO NEW-ENVIRON<br>FFFD27 | -> | |
| | <- | IAC WILL NEW-ENVIRON<br>FFFB27 |
| IAC DO TERMTYPE<br>FFFD18 | -> | |
| | <- | IAC WILL TERMTYPE<br>FFFB18 |
| IAC SB NEW-ENVIRON SEND<br>USERVAR "IBMRSEEDxxxxxxxx"<br>USERVAR "IBMSUBSPW"<br>VAR USERVAR IAC SE<br>FFFA2701 0349424D 52534545<br>447D68B9 2BE04E04 040003FF F0 | -> | |
| | <- | IAC SB NEW-ENVIRON IS<br>VAR "USER" VALUE "JSTEVENS"<br>USERVAR "IBMRSEED" VALUE<br>USERVAR "IBMSUBSPW" VALUE<br>"yyyyyyyy"<br>USERVAR "DEVNAME" VALUE "JEFFSDSP"<br>USERVAR "CODEPAGE" VALUE "37"<br>USERVAR "CHARSET" VALUE "697"<br>USERVAR "KBDTYPE" VALUE "USB"<br>USERVAR "IBMSENDCONFREC" VALUE "YES"<br>IAC SE<br>FFFA2700 00555345 52014A53 54455645<br>4E530349 424D5253 45454401 04696CD0<br>D7C41F81 0349424D 53554253 50570131<br>96A30203 3F5321FD 03444556 4E414D45<br>014A4546 46534453 5003434F 44455041<br>47450133 37034348 41525345 54013639<br>37034B42 44545950 45015553 4249424D<br>53454E44 434F4E46 52454301 594553FF<br>F0 |
| IAC SB TERMTYPE SEND<br>IAC SE<br>FFFA1801 FFF0 | -> | |
| | <- | IAC SB TERMTYPE IS IBM-3179-2 IAC SE<br>FFFA1800 49424D2D 33313739 2D32FFF0 |
| IAC DO EOR<br>FFFD19 | -> | |
| | <- | IAC WILL EOR<br>FFFB19 |
| IAC WILL EOR<br>FFFB19 | -> | |
| | <- | IAC DO EOR<br>FFFD19 |
| IAC DO BINARY<br>FFFD00 | -> | |
| | <- | IAC WILL BINARY<br>FFFB00 |
| IAC WILL BINARY<br>FFFB00 | -> | |
| | <- | IAC DO BINARY<br>FFFD00 |
| Display Confirmation Record<br>004912A0 90000560 060020C0 003D0000<br>C9F9F0F2 D9E2F0F1 F0404040 D1C5C6C6<br>E2C4E2D7 40400000 00000000 00000000<br>00000000 00000000 00000000 00000000<br>00000000 00000000 00FFEF | -> | |
| RFC 1205 Data Stream<br>001112A0 00000400 000304F3 0005D970<br>00FFEF | -> | |

Device name collision occurs when a Telnet client 40 sends the Telnet server 42 a virtual device name that it wants to use, but that device is already in use on the server 42. When this occurs, the Telnet server 42 sends a request to the client 40 asking it to try another device name. The environment option negotiation uses the USERVAR name of DEVNAME to communicate the virtual device name. Table 6 shows how the Telnet server 42 requests the Telnet client 40 to send a different DEVNAME when device name collision occurs, and is an example of how negotiations are done using environment variables, such as DEVNAME, USER, CODEPAGE, CHARSET, and so forth. These are negotiations for various display session attributes which, according to the parent application, is enhanced to include IBMSENDCONFREC. In accordance with RFC 2877, the three fields, response code 114, system name 118 and device name 120, are the only useful fields that are returned, and those only for printer emulator sessions.

TABLE 6

Negotiating Display Session Attributes

| AS/400 Telnet server | Enhanced Telnet client |
|---|---|
| IAC SB NEW-ENVIRON SEND VAR USERVAR IAC SE --> | |
| Server requests all environment variables be sent. | |
| | IAC SB NEW-ENVIRON IS USERVAR "DEVNAME" VALUE "MYDEVICE1" USERVAR "xxxxx" VALUE "xxx" ... |
| <-- IAC SE | |
| Client sends all environment variables, including DEVNAME. Server tries to select device MYDEVICE1. If the device is already in use, server requests DEVNAME be sent again. | |
| IAC SB NEW-ENVIRON SEND USERVAR "DEVNAME" IAC SE --> | |
| Server sends a request for a single environment variable: DEVNAME | |
| | IAC SB NEW-ENVIRON IS USERVAR |
| <-- "DEVNAME" VALUE "MYDEVICE2" IAC SE | |
| Client sends one environment variable, calculating a new value of MYDEVICE2. If MYDEVICE2 is different from the last request, then server tries to select device MYDEVICE2, else server disconnects client. If MYDEVICE2 is also in use, server will send DEVNAME request again, and keep doing so until it receives a device that is not in use, or the same device name twice in row. | |

Table 7 provides a detailed representation of the environment option negotiations in accordance with the present invention. In this example of a custom confirmation record, a Telnet client requesting the custom confirmation record is working in conjunction with a user exit program running on the server. The client can negotiate the environment variable "IBMSENDCUSTOMCONFREC" with ANY data as the value (not just a "YES"/"NO" value as with the regular confirmation record). It is then up to the user exit on the server to interpret this value and then send the appropriate information back to the client in the custom confirmation record. So the custom confirmation record contains the diagnostic information provided by the telnet server along with the custom information provided by the exit program.

In the example of Table 7, the client would like to know the interactive subsystem name this client job will be running in. It requests a custom confirmation record with a value of "INTERACTIVE SUBSYSTEM". Then the user exit program running on the server processes this value and sends back the interactive subsystem name, "SALES001" (hex '53 41 4C 45 53 30 30 31') in custom confirmation record.

TABLE 7

TN5250E Environment Option Negotiations

| Telnet Server | | Telnet Client |
|---|---|---|
| IAC DO NEW-ENVIRON FFFD27 | -> | |
| | <- | IAC WILL NEW-ENVIRON FFFB27 |
| IAC DO TERMTYPE FFFD18 | -> | |
| | <- | IAC WILL TERMTYPE FFFB18 |
| IAC SB NEW-ENVIRON SEND USERVAR "IBMRSEEDxxxxxxxx" USERVAR "IBMSUBSPW" VAR USERVAR IAC SE FFFA2701 0349424D 52534545 447D68B9 2BE04E04 040003FF F0 | -> | |
| | | IAC SB NEW-ENVIRON IS VAR "USER" VALUE "JSTEVENS" USERVAR "IBMRSEED" VALUE USERVAR "IBMSUBSPW" VALUE "yyyyyyyy" USERVAR "DEVNAME" VALUE "JEFFSDSP" USERVAR "CODEPAGE" VALUE "37" USERVAR "CHARSET" VALUE "697" |

TABLE 7-continued

TN5250E Environment Option Negotiations

| Telnet Server | | Telnet Client |
|---|---|---|
| | | USERVAR "KBDTYPE" VALUE "USB" |
| | | USERVAR "IBMSENDCUSTOMCONFREC" |
| | | VALUE "INTERACTIVE SUBSYSTEM" |
| | <- | IAC SE |
| | | FFFA2700 00555345 52014A53 54455645 |
| | | 4E530349 424D5253 45454401 04696CD0 |
| | | D7C41F81 0349424D 53554253 50570131 |
| | | 96A30203 3F5321FD 03444556 4E414D45 |
| | | 014A4546 46534453 5003434F 44455041 |
| | | 47450133 37034348 41525345 54013639 |
| | | 37034B42 44545950 45015553 42034942 |
| | | 4D53454E 44435553 544F4D43 4F4E4652 |
| | | 45430149 4E544552 41435449 56452053 |
| | | 55425359 5354454D FFF0 |
| IAC SB TERMTYPE SEND | | |
| IAC SE | -> | |
| FFFA1801 FFF0 | | |
| | <- | IAC SB TERMTYPE IS IBM-3179-2 IAC SE |
| | | FFFA1800 49424D2D 33313739 2D32FFF0 |
| IAC DO EOR | -> | |
| FFFD19 | | |
| | <- | IAC WILL EOR |
| | | FFFB19 |
| IAC WILL EOR | -> | |
| FFFB19 | | |
| | <- | IAC DO EOR |
| | | FFFD19 |
| IAC DO BINARY | -> | |
| FFFD00 | | |
| | <- | IAC WILL BINARY |
| | | FFFB00 |
| IAC WILL BINARY | -> | |
| FFFB00 | | |
| | <- | IAC DO BINARY |
| | | FFFD00 |
| Display Confirmation Record | -> | |
| 005112A0 90000560 060020C0 003D0000 | | |
| 09F9F0F2 D9E2F0F1 F0404040 D1C5C6C6 | | |
| E2C4E2D7 40400000 00000000 00000000 | | |
| 00000000 00000000 00000000 00000000 | | |
| 00000000 00000000 0053414C 45533030 | | |
| 31FFEF | | |
| RFC 1205 Data Stream | -> | |
| 001112A0 00000400 000304F3 0005D970 | | |
| 00FFEF | | |

Confirmation record 122 has a length member 108, length pass-through data, that in accordance with the present invention, allows extension of data being sent to include any custom information that an exit program may want to insert. This custom information 124 is appended to the end of the confirmation record, thus ensuring backwards compatibility with confirmation records 120 which do not include a custom record data field 124. In accordance with the preferred embodiment of the invention, a new environment variable, for example, "IBMSENDCUSTOMCONFREC" with a value of "YES" may be sent instead of "IBMSENDCONFREC". In response, all of the old confirmation record 120 data is returned along with any new information in custom record data field 124. This custom data 124 can be anything an application wishes to include, and can be in any format desired. It will be up to client emulator, for example, to interpret any data inserted in this custom area 124. Table 8 illustrates this concept, using the custom confirmation record presented in Table 7. The length data 108 is adjusted from '49'X to '51'X to account for the additional custom data.

TABLE 8

Example Custom Display Confirmation Record Layout for a Success or Error Response Record

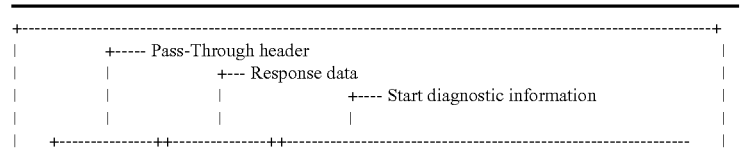

TABLE 8-continued

Example Custom Display Confirmation Record Layout for a Success
or Error Response Record

```
|      |           ||            ||                                                                       |
|      005112A090000560060020C0003D0000C9F9F0F2E3C1D9C7C5E34040D4E8C4C5                                     |
|                                     |        | T A R G E T      M Y D E                                 |
|                                     +--------+                                                           |
|                                     Response Code (I902)                                                 |
|      ---------------------------------------------------------------------------------------------       |
|      E5C9C3C54040000000000000000000000000000000000000000000000000000000                                   |
|      V I C E                                                                                             |
|                             +- End of diagnostic information                                             |
|                             |+-- Start of custom record data                                             |
|                             ||    End of custom record data --+                                          |
|      -------------------------++                              |                                          |
|                                |               +--------------+                                          |
|      000000000000000000053414C4553303031                                                                 |
+----------------------------------------------------------------------------------------------------------+
```

'0051'X = Length pass-through data, including this length field
'12A0'X = GDS LU6.2 header
'90000560060020C0003D0000'X = Fixed value fields
'C9F9F0F2'X = Response Code (I902)
'E3C1D9C7C5E34040'X = System Name (TARGET)
'D4E8C4C5E5C9C3C54040'X = Object Name (MYDEVICE)
'53414C4553303031'X = Custom Data (SALES001)

Advantages Over the Prior Art

It is an advantage of the invention that there is provided an improved system and method for establishing a client/server connection.

It is a further advantage of the invention that there is provided an improved system and method for negotiating a client/server connection in a connection-oriented protocol.

It is a further advantage of the invention that there is provided a system and method allowing customers to exploit custom solutions between clients and servers.

It is a further advantage of the invention that there is provided a system and method for enabling client emulators to request that custom information be returned by servers.

It is a further advantage of the invention that there is provided a system and method for exploiting confirmation records technology to enable clients to receive custom information from servers during session connection.

Alternative Embodiments

It will be appreciated that, although specific embodiments of the invention have been described herein for purposes of illustration, various modifications may be made without departing from the spirit and scope of the invention. In particular, it is within the scope of the invention to provide a computer program product or program element, or a program storage or memory device such as a magnetic or optical, tape or disc, or the like, for storing signals readable by a machine, for controlling the operation of a computer according to the method of the invention and/or to structure its components in accordance with the system of the invention.

Further, each step of the method may be executed on any general computer, such as an IBM System 390 (z Series), AS/400 (i Series), PC (x Series), p Series, or the like and pursuant to one or more, or a part of one or more, program elements, modules or objects generated from any programming language, such as C++, Java, Pl/1, Fortran or the like. And still further, each said step, or a file or object or the like implementing each said step, may be executed by special purpose hardware or a circuit module designed for that purpose.

While the preferred embodiment of the invention has been described primarily with respect to a Telnet environment or protocol, in a broader sense it is applicable to any connection oriented client/server protocol, such as a TCP/IP family of applications. Such protocols may make use of a confirmation record, served in accordance with the preferred embodiments of the present invention, confirming the status or other attributes associated with an actual connection. An example of such a protocol is the file transfer protocol (FTP), in which a connection is initiated and held for the duration of a file transfer. Telnet initiates and holds the connection for the duration of the dialogue between the attaching client emulator that initiates the connection to a targeted host server and its application.

Accordingly, the scope of protection of this invention is limited only by the following claims and their equivalents.

We claim:

1. A method for processing a client session request received at a server in a system including a client, a server, and host with said server executing exit programs for negotiating a confirmation record on a session connection request in which direct communication between said client and said server is held on a connection for duration of a dialogue, comprising the steps of:

said client connecting to said server;

said client and said server negotiating environment parameters for establishing a connection-oriented connection of said server with said client, said client and said server communicating over said connection using a same client/server communications protocol, said client including a graphical user interface selectively assigned a session name enabling client emulator communication at an application layer with said server;

while negotiating said environment parameters, said server inviting said client to negotiate terminal type and submit user environment variables;

said client responding by returning to said server said terminal type and submitting a request for a custom confirmation record, said request including at least one user variable;

responsive to receiving said variable and said request for a custom confirmation record from said client, said server executing an exit program for calling and passing said user variable to host application at said host external to said server, said host application processing said user variable and responsive thereto returning custom data to said server, said custom data selectively including a user variable received from said client that was selected and used; and said server concluding negotiating said environment parameters with said client selectively including sending to said client a confirmation record including said custom data received from said exit program.

2. The method of claim 1, said negotiating, inviting, and sending steps executing within the application layer of a TCP/IP protocol stack.

3. The method of claim 1, further comprising the step responsive to a variable requesting a confirmation record, sending to said client a confirmation record without said custom data.

4. The method of claim 1, said confirmation record including a field defining a pass through data length, said pass through data including said confirmation record and said custom data.

5. The method of claim 1, further comprising the step of appending said custom data to said confirmation record.

6. The method of claim 1, said request being for a default custom confirmation record, and further comprising the step of sending to said client default data received at said exit program at said server from said host application in said custom data.

7. The method of claim 1, said request being for a defined custom confirmation record, said request including a list of one or more pedefined information items, further comprising the step of sending to said client defined data in said custom data.

8. The method of claim 7, said sending step including executing at said server a customer defined exit program on said list to access said host to generate said defined data.

9. The method of claim 4, further comprising the step of providing in said custom data received at said exit program at said server from said host server.

10. The method of claim 4, further comprising the step of providing in said custom data indicia received at said exit program at said server from said host application identifying a terminal or printer device allocated by said host.

11. The method of claim 4, further comprising the step of providing in said custom data indicia received at said exit program at said server from said host application identifying an associated device linked to a current session by a host.

12. The method of claim 4, further comprising the step of providing in said custom data indicia received at said exit program at said server from said host application identifying a physical location for receiving output.

13. The method of claim 4, further comprising the step of providing in said custom data indicia received at said exit program at said server from said host application identifying system security level and password encryption requirements.

14. The method of claim 4, further comprising the step of providing in said custom data indicia identifying another device for retrying a rejected request.

15. The method of claim 4, further comprising the step of providing in said custom data indicia identifying a reason for a failed auto-signon request.

16. The method of claim 4, further comprising the step of providing in said custom data indicia identifying a reason for denial of session connection request upon system overload and redirection to an alternate time or host.

17. The method of claim 4, further comprising the step of providing in said custom data indicia received at said exit program at said server from said host application identifying custom information for interpretation by said client.

18. A client/server system including a client, a server, and a host with said server executing exit programs for negotiating a confirmation record on a session connection request in which direct communication between said client and said server is held for duration of a dialogue, comprising:

a custom confirmation record;

a user exit program running on said server;

said client operating in conjunction with said user exit program for requesting said custom confirmation record from said server, and responsive thereto for engaging in subsequent client/server negotiations; said client and said server communicating over a connection-oriented connection using a same client/server communications protcol, said client including a graphical user interface selectively assigned a session name enabling client emulator communication at an application layer with said server;

a host application program module for receiving from said exit program a user variable provided to said server by a client request for a custom confirmation record and responsive thereto for returning to said server custom data selectively including said user variable;

said server further for sending to said client a confirmation record including said custom data.

19. The system of claim 18, said client being a Telnet client.

20. The system of claim 18, further comprising:

said client being selectively operable for negotiating a send-custom-confirmation-record with a 'yes', 'no' or defined data value; and said user exit interpreting said data value and sending default or defined information received at said exit program at said server from said host application back to said client in said custom confirmation record.

21. The system of claim 20, said custom confirmation record containing diagnostic information provided by said server along with custom information received at said exit program at said server from said host application by said user exit program.

22. The system of claim 21, said custom information being provided by user exit programs executing in said server to call application programs at said host.

23. A method for operating a client to establish a network connection with a server in a system including a client, a server, and a host with said server executing exit programs for negotiating a confirmation record on a session connection request in which direct communication between said client and said server is held for duration of a dialogue, comprising the steps of:

said client connecting to said server;

said client negotiating with said server environment parameters for establishing a connection-oriented connection with said server, said client and said server communicating over said connection using a same client/server communications protocol, said client including a graphical user interface selectively assigned a session name enabling client emulator communication at an application layer with said server;

said client receiving from said server an invitation to negotiate terminal type and submit user environment variables;

said client responding to said invitation by requesting said server to provide a custom confirmation record, the request including at least one user variable; and receiving at said client said custom confirmation record, said custom confirmation record received at said client including custom data provided by a host application program responsive to receiving said user variable from an exit program executing at said server.

24. The method of claim 23, said custom confirmation record including return code, system name, device name and custom data.

25. The method of claim 24, further comprising the steps of:

operating said server to request a custom information record from said client.

26. The method of claim 25, said request comprising an invitation to said client from said server to respond with all environment variables.

27. The method of claim 26, said client responding to said invitation by returning a custom information record as part of said environment variables.

28. The method of claim 27, said client responding to said invitation with a request that said server return to said client a custom confirmation record.

29. The method of claim 28, further the steps of operating an exit program at said server to call an application at said host to interpret the value in said custom information record to selectively return a custom confirmation record response.

30. The method of claim 29, further comprising the steps of specifying in said custom confirmation record a list of custom fields to be returned by said server.

31. The method of claim 28, further comprising the steps of specifying in said custom confirmation record unstructured data for subsequent parsing and processing by said server, an application program at said host called by an exit program at said server, or an independent job.

32. A method for operating a client to establish a network connection with a server in a system including a client, a server, and a host with said server executing exit programs for negotiating a confirmation record on a session connection request in which direct communication between said client and said server is held for duration of a dialogue, comprising the steps of:

said client connecting to said server;

said client negotiating with said server environment parameters for establishing a connection-oriented connection with said server, said client and said server communicating over said connection using a same client/server communications protocol, said client including a graphical user interface selectively assigned a session name enabling client emulator communication at an application layer with said server;

while negotiating said environment parameters, receiving from said server an invitation to negotiate terminal type and submit user environment variables;

said client responding by returning to said server said terminal type and submitting a request for a custom confirmation record, said request including at least one user variable;

responsive to sending to said server said user variable requesting a custom confirmation record, receiving at said client from said server a confirmation record and custom record data for enabling said client to engage in subsequent negotiations directly with said server, said custom record data generated by said host responsive to execution of a server exit program passing to a host application said user variable.

33. The method of claim 32, said negotiating, inviting, and sending steps executing within the application layer of a TCP/IP protocol stack.

34. The method of claim 32, further comprising the step, responsive to said invitation to submit user variables, of requesting a confirmation record, and responsive thereto receiving from said server a confirmation record without said custom record data.

35. The method of claim 32, said confirmation record including a field defining a pass through data length, said pass through data including said confirmation record and said custom record data.

36. The method of claim 32, further comprising the step of receiving said custom record data appended to said confirmation record.

37. The method of claim 32, said request being for a default custom confirmation record, and further comprising the step of receiving from said server, default data in said custom record data.

38. The method of claim 32, said request being for a defined custom confirmation record, said request including a list of one or more predefined information items, further comprising the step of receiving from said server, client defined data provided by a host application responsive a server exit program in said custom record data.

39. The method of claim 38, further including the step of providing to said server a customer defined exit program accessing a host application program for parsing said list to generate said defined data.

40. The method of claim 35, further comprising the step of receiving in said custom record data indicia identifying a device allocated by said host application.

41. The method of claim 35, further comprising the step of receiving in said custom record data indicia identifying a terminal or printer device allocated by said host application.

42. The method of claim 35, further comprising the step of receiving in said custom record data indicia identifying an associated device linked to a current session by a host.

43. The method of claim 35, further comprising the step of receiving in said custom record data indicia identifying a physical location for receiving output.

44. The method of claim 35, further comprising the step of receiving in said custom record data indicia identifying system security level and password encryption requirements.

45. The method of claim 35, further comprising the step of receiving in said custom record data indicia identifying another device for retrying a rejected request.

46. The method of claim 35, further comprising the step of receiving in said custom record data indicia identifying a reason for a failed auto-signon request.

47. The method of claim 35, further comprising the step of receiving in said custom record data indicia identifying a reason for denial of session connection request upon system overload and redirection to an alternate time or host.

48. The method of claim 35, further comprising the step of receiving in said custom record data indicia identifying custom information for interpretation by said client.

49. A client system for establishing a network connection with a server in a system including a client, a server, and a host with said server executing exit programs for negotiating a confirmation record on a session connection request in which direct communication between said client and said server is held for duration of a dialogue, comprising:

a first logic element stored in a memory device at said client for negotiating environment parameters for establishing a connection-oriented connection with said server;

said parameters including a request for said server to provide a custom confirmation record to said client, said request including at least one user variable, said client including a graphical user interface selectively assigned a session name enabling client emulator communication at an application layer with said server; and a second logic element stored in a said memory device at said client for receiving said confirmation record from said server, said confirmation record including custom data provided to an exit program at said server by a host application external to said server for enabling said client to engage in subsequent programmable negotiations with said server, said client and said server communicating over said connection using a same client/server communications protocol.

50. The system of claim 49, said custom confirmation record including return code, system name, device name and custom data.

51. The system of claim 50, further comprising:
a third logic element stored in a memory device at said server for operating said server to request a custom information record from said client.

52. The system of claim 51, said request comprising an invitation to said client from said server to respond with all environment variables.

53. The system of claim 52, said client further comprising a fourth logic element stored in said memory device at said client for responding to said invitation by returning a custom information record as part of said environment variables.

54. The system of claim 53, said client further comprising a fifth logic element stored in said memory device at said client for responding to said invitation with a request that said server return to said client a custom confirmation record.

55. The system of claim 54, said server further comprising an exit program stored in said memory device at said server for calling an application at said host for interpreting the value in said custom information record to selectively return a custom confirmation record response.

56. The system of claim 54, further comprising a logic element stored in said memory device at said server for specifying a list of custom fields to be returned by said server in said custom confirmation record.

57. The system of claim 54, further comprising a logic element stored in said memory device at said server for specifying in said custom confirmation record unstructured data for subsequent parsing and processing by said server, an application at said host called by said exit program, or an independent job.

58. A system including a client, a server, and a host with said server executing exit programs on a session connection request for processing a client session request in which direct communication between said client and said server is held for duration of a dialogue, comprising:
a client memory device;
a host memory device;
a first logic element stored in said host memory device at said server for negotiating environment parameters for establishing a connection-oriented connection with said client and inviting said client to negotiate terminal type and submit user variables to said server, said client including a graphical user interface selectively assigned a session name enabling client emulator communication at an application layer with said server; and a second logic element stored in said client memory device at said client for returning to said server said terminal type and a request for a custom confirmation record, said request including at least one user variable; and an exit program stored in said host memory device at said server, responsive to receiving a user variable from said client requesting a custom confirmation record, for executing an exit program stored in said host memory device requesting of an application program stored in said host memory device at said host custom data for sending to said client in a confirmation record.

59. The system of claim 58, further comprising a TCP/IP protocol stack including within an application layer said exit program generating said custom record data.

60. The system of claim 58, said first logic element further operable responsive to a user variable requesting a confirmation record for sending to said client a confirmation record without said custom record data.

61. The system of claim 58, said confirmation record including a field defining a pass through data length, said pass through data including said confirmation record and said custom record data.

62. The system of claim 58, said first logic element further operable for appending said custom record data to said confirmation record.

63. A system for operating a client to establish a network connection with a server in a system including a client, a server, and a host with said server executing exit programs for negotiating a confirmation record on a session connection request in which direct communication between said client and said server is held for duration of a dialogue, comprising:
a client memory device;
a server memory device;
a first logic element stored in said client memory device for connecting to said server and negotiating environment parameters for establishing a connection-oriented connection with said server;
a second logic element stored in said client memory device for receiving from said server an invitation to negotiate terminal type and submit user variables, said client and said server communicating over said connection using a same client/server communications protocol, said client including a graphical user interface selectively assigned a session name enabling client emulator communication at an application layer with said server;
a third logic element stored in said client memory device at said client for sending to said server said terminal type and submitting a request for a custom confirmation record, said request including at least one user variable; and
a fourth logic element stored in said client memory device for receiving from said server a confirmation record and custom record data, said custom record data generated by a host application selecting and using said user variable passed to said host by an exit program stored in said server memory device at said server.

64. The system of claim 63, further comprising a TCP/IP protocol stack including an application layer within which said logic elements execute.

65. The system of claim 63, further comprising the step responsive to said invitation to submit user variables, requesting a confirmation record, and responsive thereto receiving from said server a confirmation record without said custom record data.

66. The system of claim 63, said confirmation record including a field defining a pass through data length, said pass through data including said confirmation record and said custom record data.

67. The system of claim 63, said second logic element further responsive for receiving said custom record data appended to said confirmation record.

68. The system of claim 63, said request being for a default custom confirmation record, and said second logic element further operable for receiving from said server default data in said custom record data.

69. The system of claim 63, said request being for a defined custom confirmation record, said request including a list of one or more predefined information items, said second logic element further operable for receiving from said server client defined data in said custom record data.

70. The system of claim 69, further including a logic element stored in said host memory device for providing to said server a customer defined exit program for calling an application at said host for parsing said list to generate said defined data.

71. A physical program storage device readable by a machine, having stored thereon a program of instructions executable by a machine to perform method steps for processing a client session request received at a server in a system including a client, a server, and a host with said server executing exit programs for negotiating a confirmation record on a session connection request in which direct communication between said client and said server is held for duration of a dialogue, said method steps comprising:

said client connecting server;

said client and said server negotiating environment parameters for establishing a connection-oriented connection with said client, said client and said server communicating over said connection using a same client/server communications protocol, said client including a graphical user interface selectively assigned a session name enabling client emulator communication at an application layer with said server;

while negotiating said environment parameters, said server inviting said client to negotiate terminal type and submit user environment variables to said server;

said client responding by returning to said by returning to said server said terminal type and submitting a request for a custom confirmation record, said request including at least one user variable;

responsive to receiving at said server said user variable and said request for custom confirmation record, said server executing an exit program for calling and passing said user variable to a host application at said host external to said server, said host application processing said user variable and responsive thereto returning custom data to said server, said custom data selectively including a user variable received from said client that was selected and used; and said server concluding negotiating said environment parameters with said client selectively including send to said client a confirmation record including said custom data received from said exit program.

72. The program storage device of claim 71, said negotiating, inviting, and sending steps executing within the application layer of a TCP/IP protocol stack.

73. The program storage device of claim 71, said method steps further comprising, responsive to a user variable requesting a confirmation record, sending to said client a confirmation record without said custom record data.

74. The program storage device of claim 71, said confirmation record including a field defining a pass through data length, said pass through data including said confirmation record and said custom record data.

75. The program storage device of claim 71, said method steps further comprising the step of appending said custom record data to said confirmation record.

76. The program storage device of claim 71, said request being for a default custom confirmation record, and said method steps further comprising the step of sending to said client default data in said custom record data.

77. The program storage device of claim 71, said request being for a defined custom confirmation record, said request including a list of one or more predefined information items, and said method steps further comprising the step of sending to said client defined data in said custom record data.

78. The program storage device of claim 77, said sending step including executing a customer defined exit program on said list to generate said defined data.

79. The program storage device of claim 74, said method steps further comprising the step of providing in said custom record data indicia identifying a device allocated by a host.

80. The program storage device of claim 74, said method steps further comprising the step of providing in said custom record data indicia identifying a terminal or printer device allocated by a host.

81. The program storage device of claim 74, said method steps further comprising the step of providing in said custom record data indicia identifying an associated device linked to a current session by a host.

82. The program storage device of claim 74, said method steps further comprising the step of providing in said custom record data indicia identifying a physical location for receiving output.

83. The program storage device of claim 74, said method steps further comprising the step of providing in said custom record data indicia identifying system security level and password encryption requirements.

84. The program storage device of claim 74, said method steps further comprising the step of providing in said custom record data indicia identifying another device for retrying a rejected request.

85. The program storage device of claim 74, said method steps further comprising the step of providing in said custom record data indicia identifying a reason for a failed autosignon request.

86. The program storage device of claim 74, said method steps further comprising the step of providing in said custom record data indicia identifying a reason for denial of session connection request upon system overload and redirection to an alternate time or host.

87. The program storage device of claim 74, said method steps further comprising the step of providing in said custom record data indicia identifying custom information for interpretation by said client.

88. A physical program storage device readable by a machine, having stored thereon a program of instructions executable by a machine to perform method steps for operating a client to establish a network connection with a server in a system including a client, a server, and a host with said server executing exit programs for negotiating a confirmation record on a session connection request in which direct communication between said client and said server is held for duration of a dialogue, said method steps comprising:

said client connecting to said server;

said client and said server negotiating environment parameters for establishing a connection-oriented connection of said client with said server, said client including a graphical user interface selectively assigned a session name enabling client emulator communication at an application layer with said server;

receiving at said client from said server an invitation to negotiate terminal type and submit user environment variables, said client and said server communicating over said connection using a same client/server communications protocol;

said client responding by returning to said server said terminal type and submitting a request for a custom confirmation record, said request selectively including a user variable;

said server executing an exit program for calling and passing said user variable to a host application at said host external to said server, said host application processing said user variable and responsive thereto returning custom data to said server, said custom data selectively including a user variable received from said client that was selected and used by said host application; and receiving at said client from said server a confirmation record including said custom data.

89. The program storage device of claim 88, said negotiating, inviting, and sending steps executing within the application layer of a TCP/IP protocol stack.

90. The program storage device of claim 88, said method steps further comprising the step, responsive to said invitation to submit user variables, of requesting a confirmation record, and responsive thereto receiving from said server a confirmation record without said custom record data.

91. The program storage device of claim 88, said confirmation record including a field defining a pass through data length, said pass through data including said confirmation record and said custom record data.

92. The program storage device of claim 88, said method steps further comprising the step of receiving said custom record data appended to said confirmation record.

93. The program storage device of claim 88, said request being for a default custom confirmation record, and said method steps further comprising the step of receiving from said server default data in said custom record data.

94. The program storage device of claim 88, said request being for a defined custom confirmation record, said request including a list of one or more predefined information items, said method steps further comprising the step of receiving from said server client defined data in said custom record data.

95. The method of claim 94, further including the step of providing to said server a customer defined exit program for parsing said list to generate said defined data.

96. The program storage device of claim 91, said method steps further comprising the step of receiving in said custom record data indicia identifying a device allocated by a host.

97. The program storage device of claim 91, said method steps further comprising the step of receiving in said custom record data indicia identifying a terminal or printer device allocated by a host.

98. The program storage device of claim 91, said method steps further comprising the step of receiving in said custom record data indicia identifying an associated device linked to a current session by a host.

99. The program storage device of claim 91, said method steps further comprising the step of receiving in said custom record data indicia identifying a physical location for receiving output.

100. The program storage device of claim 91, said method steps further comprising the step of receiving in said custom record data indicia identifying system security level and password encryption requirements.

101. The program storage device of claim 91, said method steps further comprising the step of receiving in said custom record data indicia identifying another device for retrying a rejected request.

102. The program storage device of claim 91, said method steps further comprising the step of receiving in said custom record data indicia identifying a reason for a failed autosignon request.

103. The program storage device of claim 91, said method steps further comprising the step of receiving in said custom record data indicia identifying a reason for denial of session connection request upon system overload and redirection to an alternate time or host.

104. The program storage device of claim 91, said method steps further comprising the step of receiving in said custom record data indicia identifying custom information for interpretation by said client.

105. A computer program product embodied on a physical storage medium for operating a server in a network including a client, a server, and a host with said server executing exit programs for negotiating a confirmation record on a session connection request in which direct communication between said client and said server is held for duration of a dialogue, comprising:

first program instructions for connecting said client to said server;

second program instructions for said client an said server to negotiate environment parameters for establishing a connection-oriented connection of said server with a client, said client including a graphical user interface selectively assigned a session name enabling client emulator communication at an application layer with said server;

third program instructions for said server to invite said client to negotiate terminal type and submit user environment variables to said server, said client and said server communicating over said connection using a same client/server communications protocol;

fourth program instructions responsive to said server receiving from said client a request for a custom confirmation record, said request including a user variable, for executing at said server an exit program for calling and passing said user variable to a host application external to said server, said host application processing said user variable and, responsive thereto, returning custom data to said server and sending to said client from said server a confirmation record including said custom data received from said exit program; and wherein said first, second, third, and fourth program instructions are recorded on said physical storage medium.

106. A computer program product embodied on a physical storage medium for operating a client in a network including a client, a server, and a host with said server executing exit programs for negotiating a confirmation record on a session connection request in which direct communication between said client and said server is held for duration of a dialogue, comprising:

first program instructions for connecting said client to said server;

second program instructions for negotiating environment parameters for establishing a connection-oriented connection of said client with a server, said client including a graphical user interface selectively assigned a session name enabling client emulator communication at an application layer with said server;

third program instructions for receiving from said server at said client an invitation to negotiate terminal type and submit user variables, said client and said server communicating over said connection using same client/server communications protocol;

fourth program instructions for returning to said server said terminal type and submitting a request for a custom confirmation record, said request including at least one user variable;

fifth program instructions responsive to said request for executing an exit program at said server for calling and passing said user variable to a host application at said host external to said server, said host application processing said user variable and responsive thereto returning custom data to said server, said custom data including a user variable received from said client that was selected and used;

sixth program instructions for concluding negotiation of said environment parameters and for providing to said client said confirmation record and custom record data received at said said exit program from said host; and wherein said first, second, third, fourth, fifth, and sixth program instructions are recorded on said physical program storage medium.

* * * * *